(12) United States Patent
Hernandez et al.

(10) Patent No.: US 8,642,965 B2
(45) Date of Patent: Feb. 4, 2014

(54) STRAY LIGHT BAFFLE FOR A SEEKER OR OTHER SENSOR SYSTEM AND A METHOD FOR MAKING THE SAME

(75) Inventors: Christopher L. Hernandez, Corona De Tucson, AZ (US); Nicholas B. Saccketti, Tucson, AZ (US); Jason R. Petty, Sahuarita, AZ (US); Lawrence A. Westhoven, Jr., Tucson, AZ (US)

(73) Assignee: Raytheon Company, Waltham, MA (US)

( * ) Notice: Subject to any disclaimer, the term of this patent is extended or adjusted under 35 U.S.C. 154(b) by 279 days.

(21) Appl. No.: 13/118,224

(22) Filed: May 27, 2011

(65) Prior Publication Data

US 2012/0298873 A1  Nov. 29, 2012

(51) Int. Cl.
*G02B 5/00* (2006.01)
*G01J 5/02* (2006.01)

(52) U.S. Cl.
USPC ..................... 250/339.01; 359/604

(58) Field of Classification Search
USPC ............ 244/3.1, 3.15, 3.16, 3.19; 250/237 R, 250/338.1, 339.01, 339.05; 359/601
See application file for complete search history.

(56) References Cited

U.S. PATENT DOCUMENTS

2007/0285784 A1* 12/2007 Yamada et al. ............... 359/582
2010/0127113 A1*  5/2010 Taylor et al. .................. 244/3.16
2012/0080552 A1*  4/2012 Taylor et al. .................. 244/3.16

* cited by examiner

*Primary Examiner* — Mark R Gaworecki
(74) *Attorney, Agent, or Firm* — Renner, Otto, Boisselle & Sklar, LLP (57) ABSTRACT

A stray light baffle for a seeker or other sensor system and a method for making the same are provided. The seeker, for example, may include a first receiver configured to receive an infrared signal, a second receiver configured to receive a radio frequency signal, a dichroic mirror configured to reflect the infrared signal toward the first receiver and to transmit the radio frequency signal toward the second receiver, and a stray light baffle having a coarse surface comprising a plurality of peaks and a plurality of valleys, wherein an average height of the plurality of peaks is greater than or equal to an average width of the plurality of valleys.

20 Claims, 6 Drawing Sheets

FIG. 9

STRAY LIGHT BAFFLE FOR A SEEKER OR OTHER SENSOR SYSTEM AND A METHOD FOR MAKING THE SAME

TECHNICAL FIELD

The present invention generally relates to a stray light baffle for a seeker or other sensor system and more particularly to a seeker including a stray light baffle having a coarse surface.

BACKGROUND

Missiles, rockets and other projectiles often use a seeker which gathers scene energy used for guidance and/or targeting purposes. A seeker is part of the guidance system and is typically mounted on the top or in the front of the missile or other projectile. In combination with refractive elements, a seeker typically uses a series of mirrors, lenses, and filters to focus, split and direct radio frequency signals, infrared signals, visible signals and/or other types of signals to respective receivers and often has a dome to protect the equipment. The radio frequency signals, infrared signals and visible signals may be used, for example, for imaging and targeting. The signals used by the seeker are first transmitted through the dome before being split and directed to their respective receivers by the mirrors, lenses, and filters. The missile, rocket or other projectile may have a processor to interpret the received radio frequency signal and infrared signal signals to track a target and to guide the projectile to the target.

The receivers (or sensors) designed to receive the scene signals may be protected from stray out-of-field signals by stray light (energy) baffles, which are designed to prevent unwanted energy to interfere with the desired scene energy. Typical stray light baffles are machined aluminum or some other material which is subsequently painted black to absorb stray and infrared light energy. However, the paint is often labor intensive to apply and has a tendency to flake or chip off which can then land on sensors and cause interference or undesirable light scattering. Further, after the paint has flaked or chipped off, the exposed aluminum or other material is less effective at absorbing undesirable signals or light. Alternately, a metal baffle is anodized or has a surface treatment for absorption of stray light signals. Such surface treatments, however, are much less effective than paint at absorbing stray light signals especially at large incidence angles.

Accordingly, it is desirable to have an improved stray light baffle which is not subject to the problems of current stray light baffles. Other desirable features and characteristics will become apparent from the subsequent detailed description and the appended claims, taken in conjunction with the accompanying drawings and this background.

BRIEF SUMMARY

In one exemplary embodiment a seeker is provided. The seeker may include a first receiver configured to receive an infrared signal, a second receiver configured to receive a radio frequency signal, a dichroic mirror configured to reflect the infrared signal toward the first receiver and to transmit the radio frequency signal toward the second receiver, and a stray light baffle having a coarse surface comprising a plurality of peaks and a plurality of valleys, wherein an average height of the plurality of peaks is greater than or equal to an average width of the plurality of valleys.

In another exemplary embodiment a sensor system is provided. The sensor system includes, but is not limited to, a first receiver configured to receive a ray bundle, and a stray light baffle having substantially coarse walls and configured to protect the first receiver from undesirable ray bundles.

In another exemplary embodiment, a method for building a stray light baffle, is provided. The method may include, but is not limited to, determining a shape of the stray light baffle, determining at least one material for building the stray light baffle, determining an orientation to build the stray light baffle, and building the stray light baffle using a selective laser sintering process based upon the determined shape, the at least one determined material and the determined orientation.

BRIEF DESCRIPTION OF THE DRAWINGS

The embodiments will hereinafter be described in conjunction with the following figures.

DETAILED DESCRIPTION OF THE DRAWINGS

The following detailed description is merely exemplary in nature and is not intended to limit the embodiments or the application and uses of the embodiments. Furthermore, there is no intention to be bound by any theory presented in the preceding background or the following detailed description of the drawings.

Figure 1:
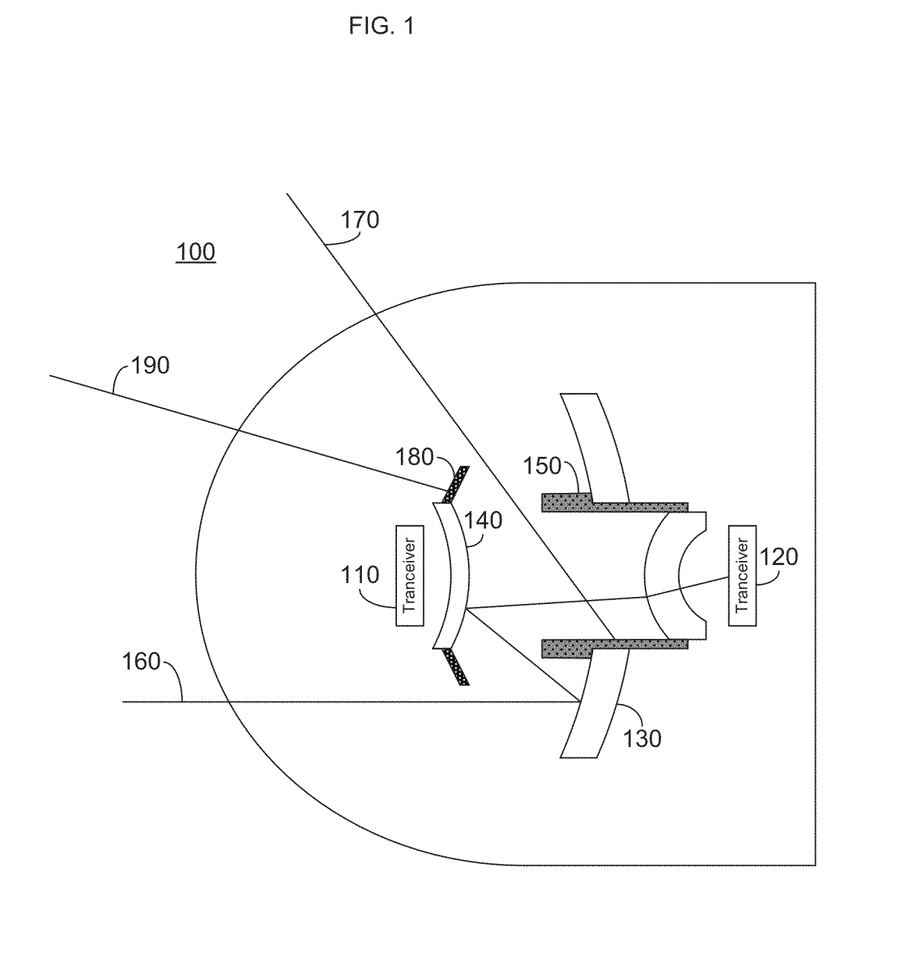
FIG. 1 illustrates a cross-sectional view of an exemplary seeker in accordance with an embodiment.

FIG. 1 illustrates a cross-sectional view of an exemplary seeker 100. The seeker 100 illustrated in FIG. 1 is a multi-mode seeker, capable of receiving several different types of signals. For example, seeker 100 could include a millimeter-wave ("MMW") transceiver 110, an infrared ("IR") receiver 120, a primary mirror 130 and a dichroic mirror 140. The primary mirror 130 is configured to reflect and focus a ray bundle, for example ray bundle 160, including a two-way MMW radiated pattern, which is a type of radio frequency (RF) signal, and a received IR signal to the dichroic mirror 140 and may be substantially parabolic in shape. The shape and composition of the primary mirror can be selected to accurately reflect the MMW signal and the IR signal received by the seeker to the dichroic mirror 140. The dichroic mirror 140 can be configured to reflect IR signals to the IR receiver 120 and is further configured to transmit (i.e., allow to pass) the MMW signal to the MMW transceiver 110. The composition and shape of the dichroic mirror 140 can be selected to focus and transmit the MMW signal to the MMW transceiver 110 while reflecting and focusing the IR signal to the IR receiver 120.

The MMW transceiver 110 may be configured to receive the MMW signal which may be used, for example, for target tracking in both clear and adverse weather conditions. The MMW transceiver 110 may also be configured to transmit a MMW signal. The IR receiver 120 is configured to receive the IR signal, which may be used, for example, to provide high resolution images for target classification and for track and aim point enhancements.

The exemplary seeker 100 shown in FIG. 1 may be an element of a missile or rocket guidance system and may have two modes of operation; millimeter-wave radar and infrared imaging. In another embodiment, the seeker 100 may have a third mode using a semiactive laser system to allow third party target designation, or any number of other enhancements. The seeker 100 illustrated in FIG. 1 is merely an exemplary seeker, other configurations using various types of sensor may also be used.

The seeker 100 also includes at least one stray light baffle 150. The stray light baffle 150, which may also be known as an optical shield, is positioned proximate to the transceiver 120 to allow appropriate ray bundles (such as ray bundle 160) to the respective transceivers 110 and 120, while blocking, deflecting and/or otherwise absorbing undesirable stray ray bundles, such as ray bundle 170, as discussed in further detail below. A ray bundle can include any combination of visible light, infrared light, or light in any other part of the electromagnetic spectrum, semi-active laser signals or any other type of electromagnetic signal with wavelength on the order of or shorter than the surface roughness dimensions. In another embodiment, for example, the seeker may also include multiple stray light baffles, such as stray light baffle 180 positioned to block, deflect and/or otherwise absorb undesirable ray bundles, such as ray bundle 190, as discussed in further detail below.

The shape of the stray light baffle 150 can vary depending upon the application. For example, the stray light baffle 150 illustrated in FIG. 1 is substantially cylindrical in shape. In other embodiments the stray light baffle 150 could be conically frustum in shape. Baffles can be any shape required to block electromagnetic radiation not part of the primary imaged scene, and may include truncated pyramids, annular sections, stepped cones or similar shapes. The shapes of stray light baffles are prominently driven by the need be adjacent to the ray bundle at preferred locations along the ray bundle and not interfere with the ray bundle while adhering to imposed seeker packaging restraints.

While the stray light baffle 150 illustrated in FIG. 1 is used in a seeker, the stray light baffle 150 may be used in any other sensor system, such as a camera (video, still or any combination thereof), test equipment or any other system which uses light or electromagnetic radiation of wavelength not greater than twice the average depth of the surface relief. For example, the stray light baffle 150 could be used in conjunction with forward Looking Imaging IR (FLIIR), night vision enhancers, and riffle IR scopes.

Figure 2:
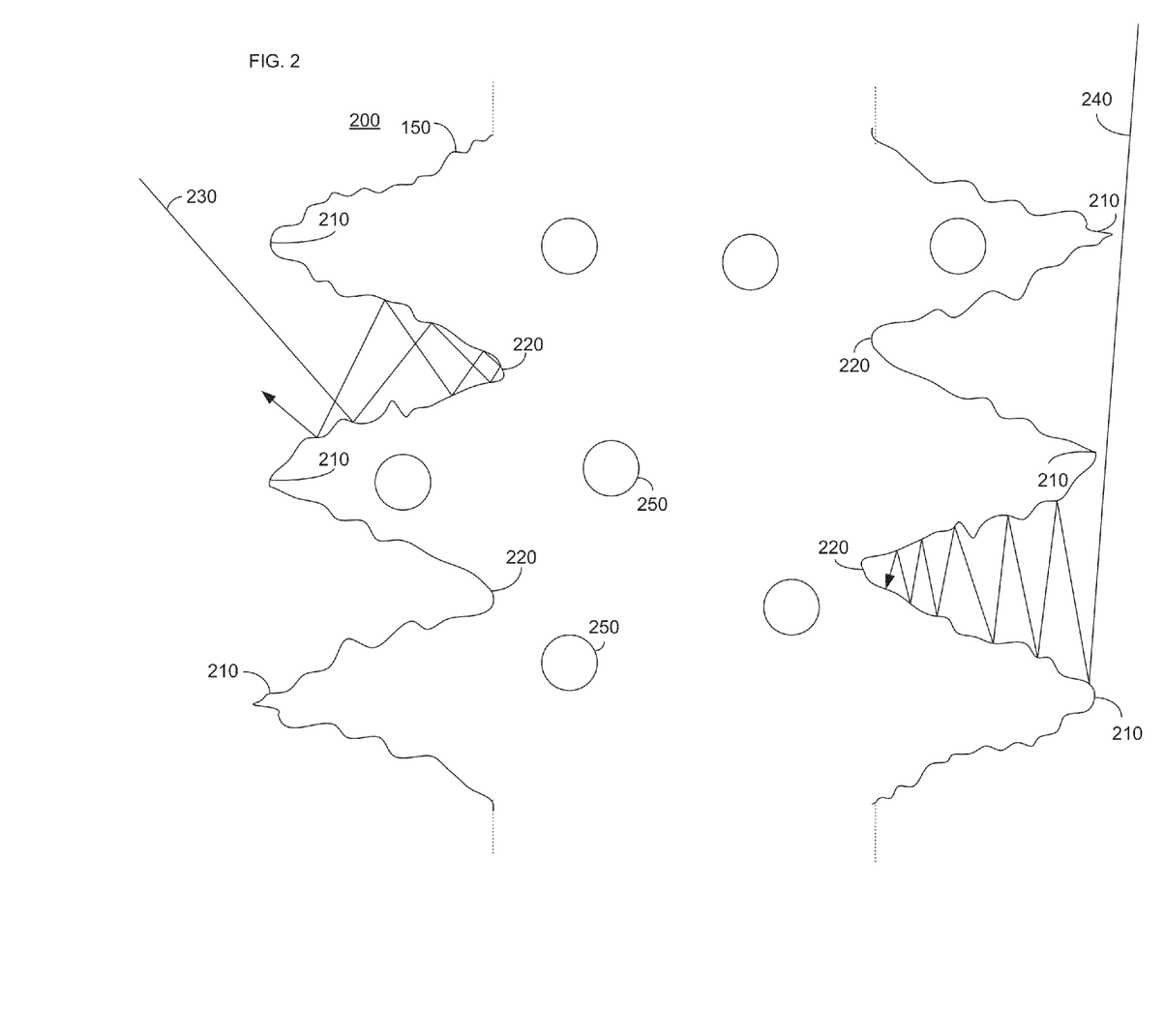
FIG. 2 illustrates is a close up, cross-sectional view of a wall 200 of a stray light baffle in accordance with an embodiment.

FIG. 2 illustrates a close up, cross-sectional view of a wall 200 of a stray light baffle 150. The wall 200 has a coarse surface having a series of peaks 210 and valleys 220. Generally, the more coarse the surface of the wall 200, the better the stray light baffle 150 will perform. The height of the peaks 210 and width of the valleys 220 can vary; however, the ratio of the height of the peak 210 to the width of the valley at the mean surface height 220 is preferably one-to-one or greater, where the height of the peak 210 is preferably greater than or equal to the width of the valley 220 for better absorption performance. For example, the ratio of the height of the peak 210 to the width of the valley 220 at the mean surface height illustrated in FIG. 2 is approximately two-to-one. In another embodiment, the average height of each peak 210 can be designed to exceed a wave length of the visible light, infrared light, or any other type of light or signal that the stray light baffle 150 is designed to protect a sensor from by at least a factor of three.

The peaks 210 and valleys 220 create a series of areas or incursions where ray bundles become trapped. The stray light baffle 150 block, deflects and/or absorbs ray bundles at both near grazing (i.e., near tangential) angles and at wider angles. Consider exemplary signals 230 and 240 illustrated in FIG. 2. Because the average height of the peaks 210 is greater than or equal to the width of the valleys 220 at the mean surface height, the stray light baffle 150 has numerous incursions where both wide angle ray bundles, such as ray bundle 230, and near grazing ray bundles, such as ray bundle 240, can become trapped. Furthermore, the materials used to manufacture the stray light baffle 150 may also aid in absorbing the ray bundle, as discussed in further detail below.

In one embodiment, for example, the stray light baffle 150 can be manufactured from a selective laser sintering (SLS) process in a SLS machine. SLS is an additive manufacturing process which uses a pool of material and a laser to build parts one layer at a time. On each layer, the laser beam traces a cross-section of the part on the surface of the material. The laser solidifies the pattern traced on the material and adheres the material to the layer below.

After a laser solidifies a layer of the part, a new layer of material is added on top of the last layer. For example, a platform where the part is being built may be lowered by a single layer thickness. The resolution of the laser sintering process creates the surface roughness—this is controllable to some degree to tune the surface roughness for the wavelength which is being absorbed. The height of each layer can typically be 0.05 mm to 0.15 mm (0.002" to 0.006"). After the prior layer is solidified a new layer of material is placed over the prior layer. On this new surface, the subsequent layer pattern is traced, adhering to the previous layer. The process is repeated until the part is completed.

In one embodiment, for example, a primary material from which the stray light baffle 150 can be made is a nylon powder. One such exemplary powder is Nytek 1100b™. Other possible materials for the stray light baffle include, but are not limited to, Ultem and Polyethylene. Any material which may be additively sintered may be used for baffle manufactured, including but not limited to aluminum-filled polymers and even titanium. One benefit of the embodiment, for example, is that the stray light baffle is made of a uniform material. Unlike prior stray light baffles whose performance tends to degrade when they are scratched or abraded, such as anodized surfaces, or when the surface paint flakes off, because the stray light baffles underlying material is the same as the surface material, the stray light baffle 150 is less subject to performance degradation from scratches or abrasion.

Other materials can be added to the primary material for building the stray light baffle 150, which can affect the properties of the stray light baffle 150. For example, carbon black can be added to turn the stray light baffle 150 black and to assist in the absorption of visible light. The carbon black can be mixed into the primary material substantially homogeneously, such that both the surface of the stray light baffle 150 and the interior of the stray light baffle 150 are black. Accordingly, in this embodiment even if the surface of the stray light baffle 150 becomes scratched, the underlying surface would still be black. Thus, the stray light baffle 150, even when scratched or abraded, would still have a substantially uniform, diffuse surface.

In other embodiments, glass microspheres 250 can be added to the primary material. The glass microspheres may decrease the density of the stray light baffle while retaining the structural properties of the baffle. Further, the glass microspheres may allow a millimeter wave signal to pass through the stray light baffle, while blocking and absorbing infrared light. In yet further embodiments, glass fibers can be added to the primary material. Glass fibers could be used to increase the strength and rigidity of the stray light baffle. Other possible additives include metal powder fillers to the polymer, which increase strength and mass, and provide blocking of RF signals. If the surface can be made coarse enough by tuning the resolution, the metal-filled polymers may even be used as absorbers for RF at all except grazing-incidence angles.

Figure 3:
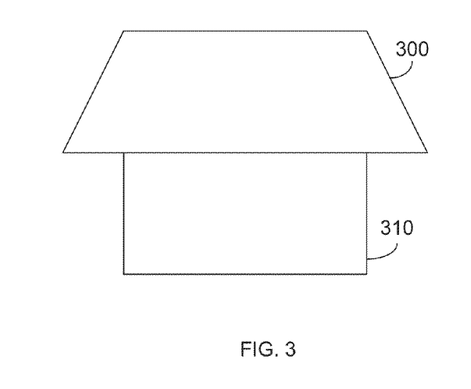
FIG. 3 illustrates a side view of an exemplary stray light baffle in accordance with an embodiment.

FIG. 3 illustrates a side view of an exemplary stray light baffle 300. In one embodiment, for example, the stray light baffle 300 is attached to a baffle holder 310. The baffle holder 310 may be used to hold the stray light baffle 300 in place. The baffle holder 310 includes at least one attachment point (not illustrated) which allows the stray light baffle 300 and baffle holder to attach to a seeker or any other sensor system. The attachment point may include, but is not limited to, a screw element, a sleeve element, a notch element, or any other type of attachment element. In one embodiment, for example, the baffle is bonded to the holder, which is then bonded to the telescope. Another advantage of the SLS process is that the surface roughness provides an excellent bonding surface. Baffles assemblies can then be threaded, bolted, clamped or bonded to sensor structure.

As discussed above, the stray light baffle 300 may be manufactured using a stereolithographic process. In one embodiment, for example, the stray light baffle 300 and the baffle holder 310 may be a single piece manufactured using the stereolithographic process discussed above. In other embodiments, the stray light baffle 300 and baffle holder 310 may be separate pieces, both manufactured using the stereolithographic process discussed above. In other embodiments, the stray light baffle 310 can be made from other materials using different manufacturing processes. For example, the baffle holder could be made from aluminum or other metals, plastics, glass or the like. The baffle holder 310 could be machined, cast, molded or be manufactured from any other process.

Figure 4:
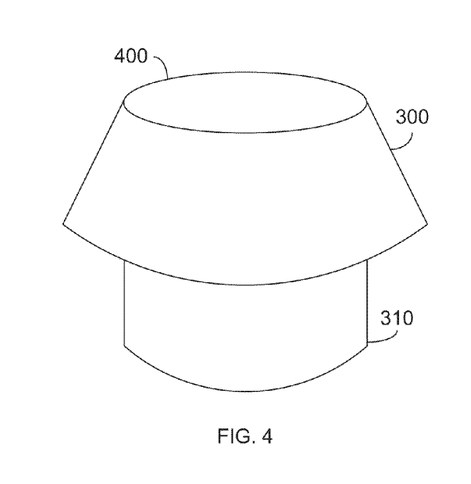
FIG. 4 is a perspective view of the stray light baffle illustrated in FIG. 3 in accordance with an embodiment.

FIG. 4 is a perspective view of the stray light baffle 300 and baffle holder 310. As seen in FIG. 4, the stray light baffle 300 is substantially conically frustum in shape (i.e., half a cone). The opening 400 in the stray light baffle 300 allows a ray bundle to reach a sensor, as illustrated in FIG. 1. As discussed above, the ray bundle may be a radio frequency signal, a light signal (i.e., visible light, infrared light or light of any other part of the electromagnetic spectrum), a laser signal, or the like.

Figure 5:
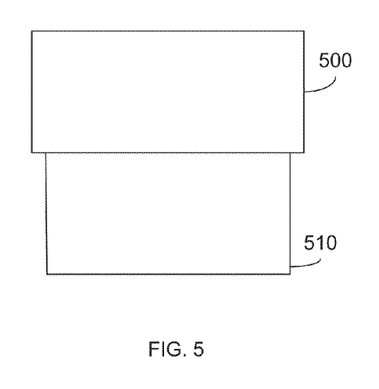
FIG. 5 illustrates a side view of another exemplary stray light baffle in accordance with an embodiment.

FIG. 5 illustrates a side view of another exemplary stray light baffle 500. In one embodiment, for example, the stray light baffle 500 is attached to a baffle holder 510. The baffle holder 510 may be used to hold the stray light baffle 500 in place. The baffle holder 510 includes at least one attachment point (not illustrated) which allows the stray light baffle 500 and baffle holder 510 to attach to a seeker or any other sensor system. The attachment point may include, but is not limited to, a screw element, a sleeve element, a notch element, a bonding surface, or any other type of attachment element.

As discussed above, the stray light baffle 500 may be manufactured using a stereolithographic process. In one embodiment, for example, the stray light baffle 500 and the baffle holder 510 may be a single piece manufactured using the stereolithographic process discussed above. In this embodiment, the entire piece would be termed the baffle. In other embodiments, the stray light baffle 500 and baffle holder 510 may be separate pieces, both manufactured using the stereolithographic process discussed above. In other embodiments, the stray light baffle 510 can be made from other materials using different manufacturing processes. For example, the baffle holder could be made from aluminum or other metals, plastics, glass or the like. The baffle holder 510 could be machined, cast, molded or be manufactured from any other process.

Figure 6:
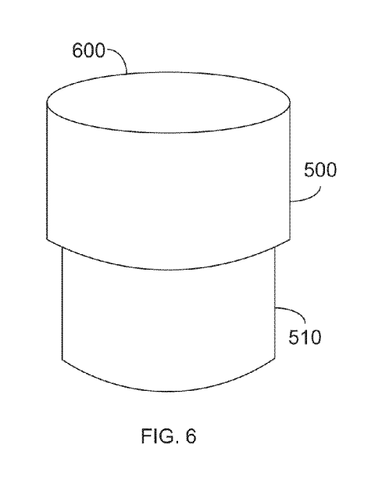
FIG. 6 is a perspective view of the stray light baffle illustrated in FIG. 5 in accordance with an embodiment.

FIG. 6 is a perspective view of the stray light baffle 500 and baffle holder 510. As seen in FIG. 6, the stray light baffle 500 is substantially cylindrical in shape. The opening 600 in the stray light baffle 500 allows a ray bundle to reach a sensor, as illustrated in FIG. 1. As discussed above, the ray bundle may be a radio frequency signal, a light signal (i.e., visible light, infrared light or light of any other part of the electromagnetic spectrum), a laser signal, or the like.

Figure 7:
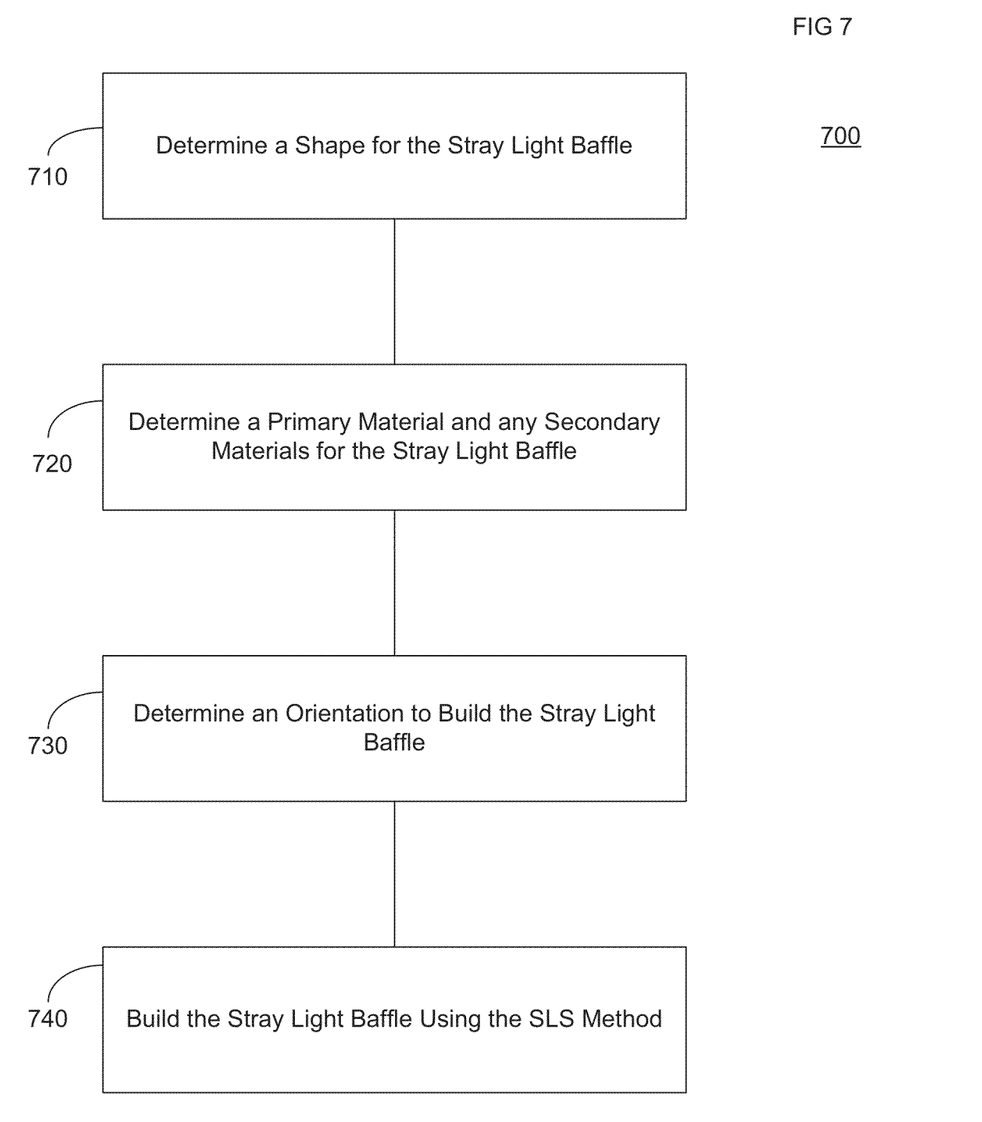
FIG. 7 is a flow chart illustrating a method for building a stray light baffle in accordance with an embodiment.

FIG. 7 is a flow chart illustrating a method 700 for building a stray light baffle in accordance with an embodiment. The method begins by determining a shape of the stray light baffle. (Step 710). As discussed above, the stray light baffle could have any shape. Another factor which may be taken into account is a distance from the leading edge of the stray light baffle to a sensor, such as the MMW transceiver 110 illustrated in FIG. 1. The edges of all baffles relative to sensor focal planes or antennas are determined using, for example, electromagnetic propagation analysis codes and optical ray-tracing codes. The primary and any possible secondary materials for the stray light baffle are then determined. (Step 720). As discussed above, the stray light baffle may have any number of secondary materials therein to cause the stray light baffle to have different properties. In other embodiments, for example, the laser power used in the manufacture of the stray light baffle may be determined. By lowering the power of the laser during the SLS process, the density of the stray light baffle can be reduced. A less dense baffle can reduce weight and possibly provide an even greater surface roughness. A lower density could also reduce dielectric loss tangent for improved RF transparency or reduced RF refractive index. An orientation for the stray light baffle is then determined. (Step 730). As discussed above, the SLS process can be used to build the stray light baffle in layers. By increasing the number of layers (i.e., transitions between layers) along a wall of the stray light baffle, the coarseness of the stray light baffle can be increased. For surfaces perpendicular to the build direction, other parameters may be adjusted to increase surface roughness.

Figure 8:
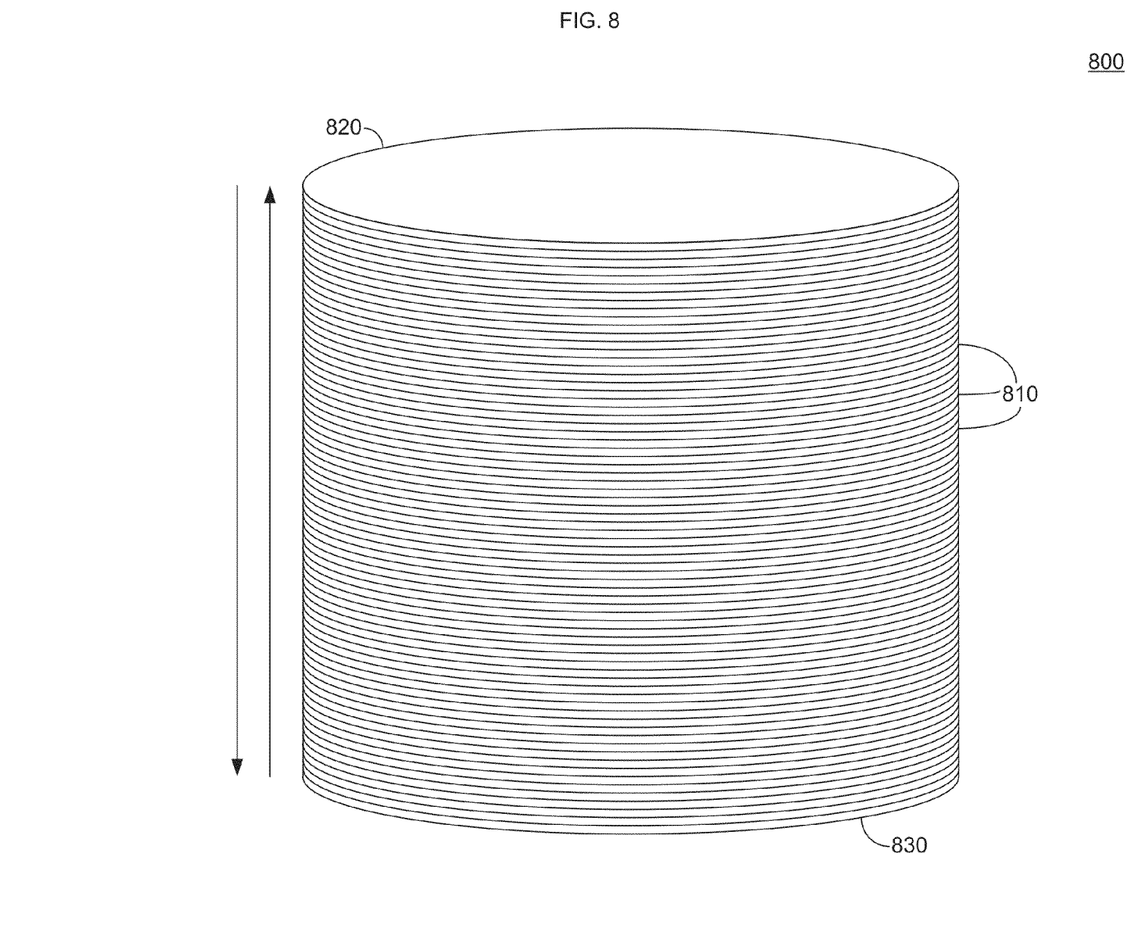
FIG. 8 is a perspective view of another exemplary cylindrical stray light baffle in accordance with an embodiment.
Figure 9:
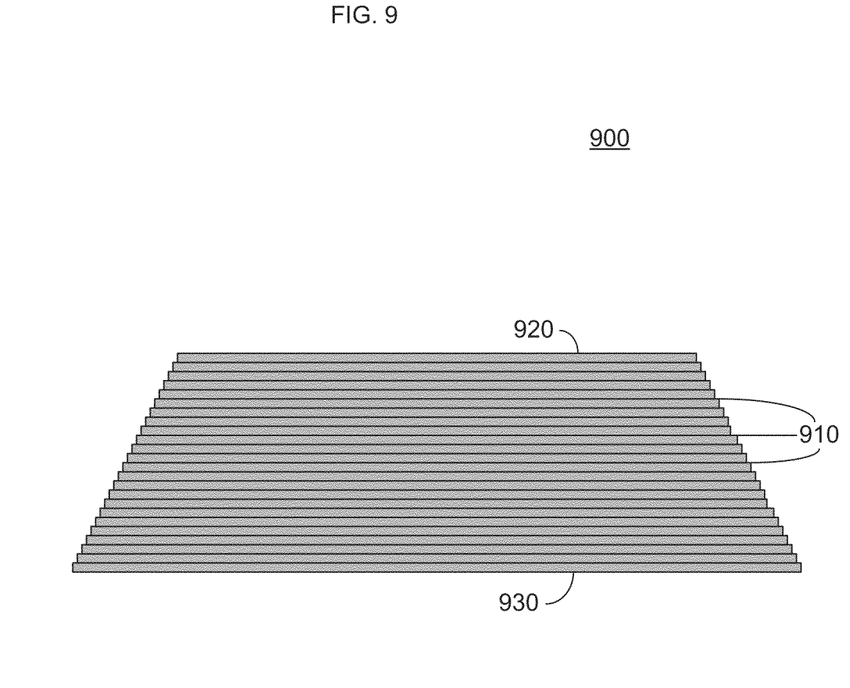
FIG. 9 is a side view of another exemplary conically frustum stray light baffle in accordance with an embodiment.

FIG. 8 is a perspective view of another exemplary cylindrical stray light baffle 800 in accordance with an embodiment. The SLS process builds the stray light baffle 800 in layers 810. It should be noted that the layers 810 illustrated in FIG. 8 are not to scale. The layers 810 are oriented substantially perpendicular to a leading edge 820 of the stray light baffle. The stray light baffle 800 can be built from the leading edge 820 to a tailing edge 830 or from the tailing edge 830 to the leading edge 820. FIG. 9 is a side view of another exemplary conically frustum stray light baffle 900 in accordance with an embodiment. The stray light baffle 900 is also built in layers 910. Similar to the cylindrical stray light baffle 800 illustrated in FIG. 8, the stray light baffle layers 910 are oriented substantially perpendicular to a leading edge 920 of the stray light baffle 900.

Returning to FIG. 7, after the shape, materials and orientation of the stray light baffle are determined, an SLS machine can be programmed to build the stray light baffle. (Step 740).

The SLS machine preheats the bulk powder material in the powder bed somewhat below its melting point, to make it easier for the laser to raise the temperature of the selected regions the rest of the way to the melting point.

The term "exemplary" is used herein to represent one example, instance or illustration that may have any number of alternates. Any implementation described herein as "exemplary" should not necessarily be construed as preferred or advantageous over other implementations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiments in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A seeker, comprising:
   a first receiver configured to receive an infrared signal;
   a second receiver configured to receive a radio frequency signal;
   a dichroic mirror configured to reflect the infrared signal toward the first receiver and to transmit the radio frequency signal toward the second receiver; and
   a stray light baffle disposed proximate the second transceiver and configured to block stray ray bundles, the stray light baffle having a coarse surface comprising a plurality of peaks and a plurality of valleys, wherein an average height of the plurality of peaks is greater than or equal to an average width of the plurality of valleys.

2. The seeker of claim 1, wherein the average width of the valleys at the mean surface height is less than or equal to four thousandths of an inch.

3. The seeker of claim 1, wherein the stray light baffle further comprises a leading edge, wherein the leading edge is a predetermined distance from one of the first receiver and second receiver.

4. The seeker of claim 1, wherein the stray light baffle is manufactured using a selective laser sintering process.

5. The seeker of claim 4, wherein the selective laser sintering process builds the stray light baffle in layers, wherein each layer is substantially perpendicular to a leading edge of the stray light baffle.

6. The seeker of claim 4, wherein the stray light baffle is primarily made of nylon.

7. The seeker of claim 6, wherein the stray light baffle further comprises glass microspheres.

8. The seeker of claim 1, wherein the stray light baffle is substantially cylindrical.

9. The seeker of claim 1, wherein the stray light baffle is substantially conically frustum.

10. A sensor system, comprising:
    a first receiver configured to receive a ray bundle; and
    a stray light baffle having substantially coarse walls and disposed proximate the first receiver, the stray light baffle configured to protect the first receiver from undesirable ray bundles.

11. The sensor system of claim 10, wherein the stray light baffle includes a plurality of peaks and a plurality of valleys, wherein an average height of the plurality of peaks is greater than or equal to an average width of the plurality of valleys at the mean surface height.

12. The sensor system of claim 11, wherein the average width of the valleys is less than or equal to four thousandths of an inch.

13. The sensor system of claim 10, wherein the stray light baffle further comprises a leading edge, wherein the leading edge is a predetermined distance from the first receiver.

14. The sensor system of claim 10, wherein the stray light baffle is manufactured using a selective laser sintering process.

15. The sensor system of claim 14, wherein the selective laser sintering process builds the stray light baffle in layers, wherein each layer is substantially perpendicular to a leading edge of the stray light baffle.

16. The sensor system of claim 10, wherein the stray light baffle is primarily made of nylon.

17. The sensor system of claim 10, wherein the stray light baffle further comprises glass microspheres.

18. The sensor system of claim 10, wherein the stray light baffle is substantially cylindrical.

19. The sensor system of claim 10, wherein the stray light baffle is substantially conically frustum.

20. A method for building a stray light baffle, comprising:
    determining a shape of the stray light baffle;
    determining at least one material for building the stray light baffle;
    determining an orientation to build the stray light baffle; and
    building the stray light baffle using a selective laser sintering process based upon the determined shape, the at least one determined material and the determined orientation.

* * * * *